(12) United States Patent
Sakiura

(10) Patent No.: US 6,509,030 B2
(45) Date of Patent: Jan. 21, 2003

(54) CULTURED FISH CAROTENOID AND POLYPHENOL ADDED FEED FOR IMPROVING FISH BODY COLOR TONE AND FISH MEAT BRILLIANCE

(75) Inventor: Toshiyuki Sakiura, Tokyo (JP)

(73) Assignee: Toshiyuki Sakiura, Konan-Ku (JP)

( * ) Notice: Subject to any disclaimer, the term of this patent is extended or adjusted under 35 U.S.C. 154(b) by 0 days.

(21) Appl. No.: 09/754,111

(22) Filed: Jan. 5, 2001

(65) Prior Publication Data

US 2001/0043982 A1 Nov. 22, 2001

(30) Foreign Application Priority Data

Apr. 20, 2000 (JP) ........................................ 2000-119390

(51) Int. Cl.⁷ .......................... A23K 1/17; A61K 47/00; A61K 31/05; A61K 31/015
(52) U.S. Cl. ....................... 424/442; 424/439; 514/732; 514/763
(58) Field of Search ................................ 424/439, 442, 424/732; 514/763

(56) References Cited

U.S. PATENT DOCUMENTS 4,239,782 A * 12/1980 Cinquemani ................... 426/2

FOREIGN PATENT DOCUMENTS

| EP | 0 659 402 A2 | 6/1995 |
|----|--------------|--------|
| GB | 2 361 404 A | 10/2001 |
| JP | 10-225266 | 8/1998 |
| WO | WO 98/18345 | 5/1998 |

OTHER PUBLICATIONS

Partial European Search Report for corresponding EP Appln No. EP 012306924, dated Feb. 2, 2002.

Patent Abstracts of Japan for Jap. Publ. No. 08332052, published Dec. 17, 1996.

Patent Abstracts of Japan for Jap. Publ. No. 07067546, published Mar. 14, 1995.

Databse WPI–Abstract for JP2135070, published May 23, 1990.

* cited by examiner

Primary Examiner—Kevin E. Weddington
(74) Attorney, Agent, or Firm—Smith, Gambrell & Russell, LLP

(57) ABSTRACT

An inexpensive cultured fish feed contains a prescribed amount of proanthocyanidin to thereby make an addition amount of carothenoid small. Proanthocyanidin is added by 0.004–0.04 weight percent to a culture feed containing crothenoid.

1 Claim, No Drawings

CULTURED FISH CAROTENOID AND POLYPHENOL ADDED FEED FOR IMPROVING FISH BODY COLOR TONE AND FISH MEAT BRILLIANCE

BACKGROUND OF THE INVENTION

The present invention relates to a cultured fish feed which is a carotenoid added feed with proanthocyanidin added.

In the fish culture it is well known that the quality of cultured fishes is inferior to that of natural fishes. Taste and smell of food fishes are important, but first of all, food fishes must appeal to consumers. To this end, good color tones of fish bodies and fish meat brilliance are essential.

In view of this, for increasing commodity value of fishes various effective coloring matters have been accumulated in fish meat and body skin. To given a example, carotenoid, such as asthaxanthine, canthaxanthine, etc. has been added to feed for cultured fish. However, a number of factors are involved in good fish body color tones and fish meat brilliance, and it has been a problem that resorting to carotenoid alone affects those of the factors, such as the color of bloody-colored fish meat, etc.

To solve such problem the culture method of simply adding proanthocyanidin to feed has been conventionally developed (refer to, e.g., Specification of Japanese Patent Laid-Open Publication No. 225266/1998).

This prior art has an advantage of increasing kinds of coloring additives to feed, but has a disadvantage that increase of kinds of additives and increase of addition amounts add to the prices of the feed.

In order to solve the disadvantage of the conventional cultured fish feed, the present invention aims to provide a cultured fish feed to which carotenoid is added and polyphenol is further added so as to redouble the effect of fixing carotenoid to fish bodies, whereby addition amounts of carotenoid to the feed can be decreased as much as possible, and the feed is accordingly inexpensive and has the coloring effect superior to that of the conventional feed with the coloring matters added. Furthermore, the present invention aims to suppress occurrence and generation of activated oxygen and peroxide in the fish body, and to thereby prevent obstruction of the growth and metabolism in the fish body. In addition, the present invention aims to reduce defects caused by the oxygen's effect against the color tone, flavor and brilliance of fish meat. Thus good quality of growing fish body can be improved.

SUMMARY OF THE INVENTION

The cultured fish carotenoid added feed according to the present invention contains carotenoid for improving the color tone and meat brilliance of cultured fishes contains a prescribed amount of proanthocyanidin added to a culture fish feed containing a carotenoid group coloring material.

DETAILED DESCRIPTION OF THE PREFERRED EMBODIMENTS

One embodiment of the present invention will be explained below.

First, the cultured fishes the present invention relates to are freshwater fishes, e.g., trouts, such as rainbow trout, carp, colored fishes including goldfish, and seawater fishes, such as sea bream, salmon, tuna, yellow tail, robster, pet fishes, etc.

According to the present invention, coloring of the bodies of fishes, e.g., body color tones, fish meat brilliance, etc. can be redoubled. Here, color tone means lightness and saturation of the surface of a fish body. Fish meat brilliance means lightness and saturation of the meat of the edible part of a fish body.

The cultured fish feed of the present invention comprises a substrate, and additives for improving the substrate. The substrate comprises substrate materials, and substrate additives.

The substrate material is composed of mainly animal feed, e.g., fish powder; cereals; bran; etc. The substrate additives are various vitamin preparations for assisting formation of fish bodies, required inorganic materials, and asthaxanthine (0.004–0.02 wt. % (percent)), which is a carotenoid, as a coloring material. The substrate improving additive is proanthocyanidin (0.004–0.04 wt. % in pellets), which is polyphenol.

Next, a coloring component for coloring fish bodies will be explained.

Asthaxanthine, which is the coloring material as one of the above-described substrate additives, belongs to the carotenoid coloring matter and is abundant in crustacean among acquatic products. It is know that asthaxanthine is an essential coloring factor of sea bream. This material, which is intrinsically very unstable in acidic environment, and tends to decompose, and is, even in neutral or basic environment, easily oxidized (such as air-oxydation), as same as other coloring matters in carotenoid group. When the asthaxantine has such decomposition and deterioration, etc. by acid and due to oxidation, asthaxantine in fish bodies inevitably accordingly decreases. Additionally, such decomposition and deterioration change color tones of the fish meat of fishes. The color change is generally to reddish dark color, i.e., dark reddish brown or purple, which much reduces commodity values of fishes.

According to the present invention, in order to prevent such decrease of asthaxanthine in a fish body and prevent such harmful color tone change of asthaxanthine, a substrate improving additive is added to the substrate. Here, proanthocyanidin is used as the substrate improving additive.

On the other hand, proanthocyanidin used as the substrate improving additive forms the aglycon of anthocyanidin, which is a flavonoid group glycoside coloring material and controls color tones of the coloring material. The color tones change in a wide range from yellow to orange and to red.

Anthocyanidin chemically has trihydroxyphenylbenzopyrilium skelton as the basic structure. Chemically anthocyanidin has basically benzopyrilium structure and stable when acid. When very weak acidic and when basic, anthocyanidin has various quinoid structures, and has various color tones depending on pH's, and is very unstable when neutral and basic and fades.

The chemical properties of asthaxanthine (the substrate additive) and proanthocyanidin (substrate improving additive) described above are compared with each other as follows.

|   |   | Asthaxanthine | Proanthocyanidin |
|---|---|---|---|
| a) | basic color tone | Yellow~ Orange~red~ Reddish purple* | Yellow~ Orange~red* |
| b) | acidic | very unstable | Stable |
| c) | neutral | Unstable | A little unstable |
| d) | basic | Unstable | Very unstable |

Note:
*change depending on conditions.

With reference to this comparison table asthaxanthine and proanthocyanidin will be compared with each other. When acidic, asthaxanthine is chemically very unstable while proanthocyanidin is chemically stable. That is, chemical properties of both coloring materials are complementary with each other when very weak acidic.

On the other hand, fishes are observed. The fish meat of healthy fishes is very weak acidic (pH: about 5–6). When asthaxanthine alone is dispensed, the asthaxanthine is broken while passing through the acidic environment when taken in a fish body, and even after taken in good quality, the asthaxanthine is exposed to the state which makes the asthaxanthine unstable in the fish meat. This is a cause for the very low yield of asthaxanthine in a fish body.

The present invention has noted this point. In order to remedially compensate this property of astaxanthin which should be called a weak point, a red-group coloring matter which is stable in acidic environment is added, and is specified by proanthocyanidin, whereby high yields of astaxanthin in a fish body, a small dose of astaxanthin to cultured fishes, and a small addition amount of astaxanthin to the feed are realized.

With the feed with a reduced addition amount of asthaxanthin, fishes are less burdened with carotenoid, whereby the meat of the fishes can be healthy and be made comparable with that of natural fishes.

Furthermore, proanthocyanidin as the above-described substrate improving additive is added, whereby peroxide value and acid value of meat of fishes can be much reduced, whereby taste of the edible parts of the fishes can be long retained. As an additional effect, affection of fishes by deteriorated lipid of the feed can be reduced.

A color improving coloring matter is thus specified as one feed substrate improving additive, and can be added to the substrate of the feed at an arbitrary point of the feed production, so that the addition of the color improving coloring matter can be optionally adjusted in accordance with various conditions, such as supply of raw materials of the feed, etc. The preparation of the feed can be more flexible herein.

According to the cultured fish carotenoid and polyphenol added feed, remarkable advantageous effects that smaller amounts of carotenoid may be added to cultured fish feeds, lightness and saturation of fish bodies and brilliance of fish meat can be improved, and health of fishes is much improved, and other advantageous effects can be produced.

EXAMPLES

Examples of the cultured fish carotenoid and polyphenol added feed according to the present invention, which contains carotenoid and polyphenol for improving color tone of the bodies of cultured fishes and brilliance of the fish meat will be explained.

(i) Fish Culture Test 1
Rainbow Trout

Example 1

In a fish culture test using the cultured fish feed according to the embodiment of the present invention, discrete fish preserves were prepared one for a test section and the other for a control section (both sections are under the same conditions). Five young rainbow trouts (length: about 18 cm) were discharged at random in each fish preserve and cultured for 2 months. All the rainbow trouts (Example 1) were measured about appearance, and dissected to be measured.

Preparation of Feed

A substrate of the cultured fish feed used in examples of the present invention can be optionally selected in accordance with purposes of the culture. As one instance of the substrate, the raw materials of the substrate of the feed, the inventor of the present invention used, and blend ratios of the raw materials are shown in TABLE 1. The component amounts of a feed substrate which can be used in the present Example and is available on market are shown in TABLE 2, and the names of the additives to the substrate are shown in TABLE 3.

TABLE 1

| Raw materials, etc. | | |
| --- | --- | --- |
| Classes of Raw Materials | Blend Ratio | Raw Materials |
| Animal Feed | 60% | Fish Powder, Euphausiid meal |
| Cereals | 24% | Wheat flour, (Dextrin) |
| Vegetable Oil Cake | 10% | Soybean oil cake, (Cone gluten meal) |
| Others | 6% | Animal fat, Calcium Phosphate, (Feed yeast) |

Note:
The bracketed raw materials are not essentially used here.

TABLE 2

| Component amounts | |
| --- | --- |
| Crude Protein | Not less than 46.0% |
| Crude Fat | Not less than 12.0% |
| Crude Fiber | Not more than 3.0% |
| Crude Ash | Not more than 17.0% |
| Calcium | Not less than 2.20% |
| Phosphorus | Not less than 1.30% |

TABLE 3
Names of Contained Feed Additives

Vitamin A, Vitamin D3, Vitamin E, Vitamin K3, Vitamin B1, Vitamin B2, Vitamin B6, Vitamin B12, Nicotinic acid, Pantothenic acid, Folic acid, Choline, Inositol, Biotin, Vitamin C, Iron sulfate, Manganese sulfate, Magnesium sulfate, Zinc sulfate, Copper sulfate, Cobalt sulfate, Calcium iodate, Asthaxanthine, Ethoxyquin.

A sample feed (hereinafter called "a basic feed" basically has the above-stated substrate mixed with 80 ppm of asthaxanthine. For the test section, 0.1 weight % of proanthocyanidin, as a substrate improving additive, in the form of an additive KPA-F (16% proanthocyanidin content) marketed by Kikoman K.K. was added to the basic feed (hereinafter called "an improved feed"). For the control section, the basic feed alone was used. The doses of the feeds followed the usual trout culture conditions.

The above-described feeds may be raw or in the form of pellets or capsules. In the form of pellets, the feeds may be dry or moist. When the feeds are raw, the feeds may be mashed, hashed or chopped. What is important is to appeal to the cultured fishes. In the form of pellets, preferably the basic feed is blended with the additive when pelletized. This is for preventing oxidation of the additive.

As a method of evaluating results of the test, the appearance, length and weight of the sample fishes were measured, and the dissected fishes were measured (fish meat brilliance measure (optical and sensory test), taste (comparison) and weights of the internal organs, etc.)

(a) Test Result

Here, first general states of the sample fishes will be briefed, and then main results of the fish culture test will be detailed.

TABLE 4 shows measured values of the sample fishes, and Table 5 shows ratios between the measured values of the sample fishes of the test section and those of the sample fishes of the control section.

TABLE 4

Measurements of sample fishes

| Item | Test Section Average (max./min.) | Control Section Average (max./min.) |
|---|---|---|
| Body length (cm) | 17.84 (18.5/16.3) | 18.16 (18.8/17.5) |
| Body weight (g) | 92.30 (107.2/73.4) | 93.6 (103.4/83.2) |
| Body weight/Body length ratio (g/cm) | 5.15 (4.54/5.79) | 5.15 (4.75/5.65) |
| Internal Organ wt./Body wt. Ratio (%) | 10.47 (10.96/9.78) | 10.19 (10.87/9.86) |
| Lever wt./Body wt. Ratio (%) | 1.15 (1.23/1.09) | 1.94 (1.16/0.98) |
| Lever wt./Internal Organ wt. Ratio (%) | 10.98 (12.00/10.13) | 10.32 (12.22/9.00) |
| Fillet wt./Body wt. Ratio (%) | 58.22 (58.86/57.20) | 58.52 (60.65/57.74) |
| Fatness | 1.57 (1.68/1.42) | 1.56 (1.69/1.50) |

TABLE 5

Comparison of the fishes between test section and control section

| Item | Test Section/ Control Section |
|---|---|
| Body length (cm): | 98.24 |
| Body weight (g): | 98.61 |
| Body weight/Body length ratio (g/cm): | 1.00 |
| Internal organ weight/Body weight ratio (%): | 102.75 |
| Lever weight/Body weight ratio (%): | 59.93 |
| Lever weight/Internal organ weight ratio (%): | 106.40 |
| Fillet weight/Body weight ratio (%): | 99.49 |

As apparent in TABLE 4 and 5, the fishes in the test section are substantially equal to the fishes in the control section in the body length, body weight, body weight/body length ratio, fatness and edible part ratio (fillet weight/body weight ratio). In the internal organ weight/body weight ratio, however, the former is higher even by 3% than the latter, and higher by above 6% than the latter in the lever weight/internal organ weight ratio. This means that the internal organs of the cultured fishes in the test section grow better. The lever weight/body weight ratio between the fishes of the test section and those of the control section is below 60%. This means that the fishes in the test section have no hypertrophy of the lever, i.e., that the fishes in the test section are healthy than the fishes in the control section. This suggests that the meat of the fishes in the test section is improved to be near that of the natural fishes.

(b) Asthaxanthine Amount in the Fish Meat

Amounts of asthaxanthine, which is a coloring matter, in the meat of the fishes of the test and the control sections were measured in the unit of ppm. The value was 8.25 for the test section, and the value was 6.57 for the control section. Accordingly, a ratio between the test section/the control section was 125.42%. This means that according to the present example, a dose of asthaxanthine can be smaller by about 25.4% than the conventional method, i.e., asthaxanthine can be saved by above ¼.

(c) Color Difference in Meat Color

Color differences of the fish meat between the fishes of the test section and those of the control section were measured. The result is shown in TABLE 6.

TABLE 6

Measured values of color differences of fish meat

| | Test Section (I) | Control Section (II) | Difference Both Section (I − II) |
|---|---|---|---|
| Color difference L | 41.53 | 43.77 | −2.16 |
| a | 7.50 | 7.30 | +0.20 |
| b | 10.25 | 10.53 | −0.28 |
| a/b | 0.73 | 0.69 | +0.04 |

Here, L represents lightness; a represents red-green color tone (increase of a positive value is increase of red, and increase of a negative value is increase of green); b represent yellow-blue color tone (increase of a positive value is increase of yellow, and increase of a negative value is increase of blue); and a/b represents saturation.

As shown in TABLE 6, the value of the lightness L of the test section is smaller by 2.16 than that of the control section. This means that the lightness of the meat of fishes of the test section is higher. That is, the meat of the fishes of the test section visually gives the impression of freshness.

The value of red-green color tone a of the test section is larger by 0.20 than that of the control section. This means the fish meat of the test section is more reddish than that of the control section. The value of yellow-blue color tone b of the test section is smaller by 0.28 than that of the control section. This means that the fish meat of the test section is a little more yellowish than that of the control section. The value of lightness a/b of the test section is larger by 0.04 than that of the control section. This means that the fish meat of the test section is superior in saturation to that of the control section. Based on all these results, the color of the fishes of the test section is visually noticeable than that of the fishes of the control section. A visual sensory test gave the result which agrees with these measured values.

Then, as described above, coloring abilities of both carothenoid and proanthocyanidin are closely related with pH. Thus, pH's of the fish meat were measured. As a result the fish meat of the test section had a pH of 6.53, and that of the control section had a pH of 6.50. This means that the meat of the fishes of the test section is nearer the neutral side than that of the control section, and the fishes of the test section are healthier than those of the control section.

Peroxide values (POV) of the fish meat were measured. The fish meat of the test section had 15.46% POV, which is very low. POV indicates possibility of retaining product quality (freshness) of the fish meat. As the fish meat has lower values, the fish meat has better quality and can retain the quality longer. Thus, the above-described effect shows that the fish meat of the test section is healthier than that of the control section, that the healthy state can be long retained, and that accordingly the taste of the edible part of the fishes can be long retained.

An acid value (AV) of the test section was 0.21, which is correspondingly smaller than the 0.49 AV of the control section. This means that the fishes of the test section more depress generation of peroxides than those of the control section, i.e., are in a desirable state that is less liable to oxidation.

Water and fat of the fish meat were measured in percentage as reference materials for judging the quality of the fish meat. The fish meat of the test section has a little less fat (2.47%) than the fish meat of the control section (2.68%). Water of the fish meat of the test section (75.9%) was substantially equal to that (75.5%) of the fish meat of the control section. This means that the fish meat of the test section is tighter by about 8% than that of the control section.

(ii) Fish Culture Test 2

Rainbow Trout

Example 2

A culture test was made for the purpose of verifying the effect of coloring meat of rainbow trouts (Example 2) by a substrate improving additive (proanthocyanidin). The procedures of this test are generally the same as those of the test of Example 1, and the major points will be explained below.

One hundred (100) rainbow trouts were discharged in each of two flowing water preserves (275 cm length, 76 cm width, 36 cm depth) and cultured. The fishes had weights of 70–80 g when the culture test was started. After 1 month and 2 months from the start of the culture test, 10 fishes were taken out at random from each preserve, and the same measurement made on the above-described rainbow trouts (Example 1) was made on the fishes taken out. Measurement items were (1) body length, (2) body weight, (3)internal organ weight, (4) meat color (comparison: color guide), (5) taste (comparison), (6) death rate, (7)growth rate, and (8)asthaxanthine content of the meat.

Sample Feed

As the feed used in growing the rainbow trouts, a feed whose substrate contains much animal protein (Nippai rainbow trout growing formula feed "Tennen Shiageyou 5p" marketed by Nippon Haigoou ShiryoK.K.) was used. The composition of the feed is shown in TABLE 7, and the raw materials are shown in TABLE 8.

The additives to the substrate are shown in TABLE 9. The additives to the substrate are various vitamins and various inorganic substances. In comparison with the additives of the rainbow trout feed used in Example 1, biotin, aluminium hydroxide, etc. are added, but zinc sulfate, calcium iodate were omitted. Both have a little difference, which will not be influential to the color of the meat.

TABLE 7

| | Composition of feed Net weight: 20 Kg | |
|---|---|---|
| Component Amount | Crude protein | Not less than 46.0% |
| | Crude fat | Not less than 7.0% |
| | Crude fiber | Not more than 3.0% |
| | Crude ash | Not more than 13.0% |
| | Calcium | Not less than 1.6% |
| | Phosphorus | Not less than 1.4% |

TABLE 8

| Raw materials, etc. | | |
|---|---|---|
| Classes of raw materials | Blend ratio | Raw materials |
| Animal feed | 54% | Fish powder |
| Cereals | 39% | Wheat, extruded Soybean |
| Brans | 5% | Rice bran |
| Others | 2% | Calcium phospate, Salt, Canthaxanthine |

TABLE 9

Names of Contained Feed Additives

Viatmin A, Vitamin D3, Vitamin E, Vitamin K3, Vitamin B1, Vitamin B2, Nicotinic acid, Pantothenic acid, Biotin, Folic acid, Vitamin B12, Coline, Inositol, Vitamin C, Zinc carbonate, Zinc sulfate, Calucium iodate, Cobalt sulfate, Iron sulfate, Copper sulfate, Manganese sulfate, Magnesium sulfate, Potasium dihydrogenphosphate, Aluminium hydrdoxde, Ferrous iron fumarate, Asthaxanthine, Ethoxyquin.

As in Example 1, a substrate improving additive was proanthocyanidin. Proanthocyanidin was added in the form of KPA-F described above by 0.1% of a substrate amount.

Test Result

TABLE 10 shows values of major items of the result of the above-described rainbow trout culture test (Example 2). TABLE 11 shows detailed data of color difference.

TABLE 10

| Test result: component analysis | | |
|---|---|---|
| | Test Section | |
| Test Item | Test section (polyphenol section) | Control section |
| Water (%) | 75.9 | 75.5 |
| Fat (%) | 2.47 | 2.68 |
| PH | 6.53 | 6.50 |
| Acid value | 0.21 | 0.49 |
| Peroxide Value | 0.32 | 2.07 |
| Asthaxanthine (ppm) | 8.24 | 6.57 |
| Color difference | | |
| L | 41.53 | 43.77 |
| a | 7.50 | 7.31 |
| b | 10.25 | 10.53 |
| a/b | 0.73 | 0.69 |

TABLE 11

| Data of color difference | | | | |
|---|---|---|---|---|
| Color difference | L (Lightness) | a (Red-green group) | b (Yellow-green group) | a/b (Saturation) |
| Test section 1 | 41.17 | 8.73 | 10.54 | 0.83 |
| Test Section 2 | 41.10 | 4.58 | 8.47 | 0.54 |
| Test Section 3 | 39.46 | 10.30 | 11.36 | 0.91 |
| Test Section 4 | 39.54 | 8.18 | 9.63 | 0.85 |

TABLE 11-continued

Data of color difference

| Color difference | L (Lightness) | a (Red-green group) | b (Yellow-green group) | a/b (Saturation) |
|---|---|---|---|---|
| Test SecTion 5 | 41.67 | 7.52 | 9.61 | 0.78 |
| Control section 1 | 39.83 | 7.87 | 9.94 | 0.79 |
| Control section 2 | 43.41 | 6.94 | 10.87 | 0.64 |
| Control Section 3 | 42.71 | 7.87 | 10.59 | 0.74 |
| Control Section 4 | 40.08 | 6.31 | 8.67 | 0.73 |
| Control Section 5 | 41.10 | 11.15 | 11.98 | 0.85 |

TABLE 10 shows that the peroxide value (15.46%)of the fishes of the test section was much lower than that of the fishes of the control section, the acid value (42.86%)of the fishes of the test section was accordingly low, the fat was a little lower (difference: 0.21%, ratio: 7.86%). This means that also in the rainbow trout culture, the addition of proanthocyanidin is very good to the fish meat, and the taste can be long retained. This means that the fishes are very healthy, i.e., are near the natural fishes. What is more important is that the pH is within the weak acid range and near the neutral range. This means that a condition under which proanthocyanidin tends to give red color, and also asthaxanthine tends to give reddish orange color is prepared.

Accordingly, by adding proanthocyanidin, the proanthocyanidin and the asthaxanthine synergetically act to give reddish yellow color to the meat of the fishes. As a result, an addition amount of asthaxanthine can be much decreased.

(iii) Fish Culture Test 3
Red Sea Bream

A fish culture test was made for the purpose of verifying the influence of the substrate improving additive to red sea bream. The procedures of the fish culture test and the verifying method are shown in TABLE 12. The procedures and the method are basically the same as those of the trouts culture tests (Example 1 and 2) have been explained above, and details of the procedures and the method are omitted.

TABLE 12

Summary of Conditions for Making the Red Sea Bream Culture Test

Test Method:
The currently used finishing feed having KPA-F added by 0.1% was fed to cultured red sea breams which were raised in the same environments as cultured red sea breams fed (in a control section) with the currently used finishing feed (blank). The former red sea breams were compared with the latter red sea breams.

Test Facilities:
10 m length, 10 m width 7.5 m depth sea preserve, Number of discharged fishes: 9000 fishes, Fish body size at the start of the test: 0.8–1.0 Kg. The same for the control section.

Feed:
0.1% of KPA-F added to finishing feed (TAI DELUX S-8, sea bream feeding formula feed, Nisshin brand).

Dose of the Feed:
120–140 Kg/2 days for once for one sea preserve.

Verifying Method:
10 fishes were taken out from each of the test preserve and the control preserve at random 1 month, 2 months and 3 months after the feeding was started and measured.

(1) Body length, (2) Body height, (3) Body Weight, 4) Internal organ weight, (5) Body color (compared), (6) Meat color (compared), (7) Taste (compared), (8) Asthaxanthine content of body skin.

The differences of the test procedures stated in TABLE 12 from those of the above-descried rainbow trout culture tests are that:

(a) the sample fishes were sea fishes (sea breams);
(b) the test means were large-scale sea preserves (dimensions: 10 m length, 10 m width, 7.5 m depth), and the number of cultured fishes per one preserve was accordingly increased;
(c) the sample fishes were a little larger-sized (0.8–1.0 Kg);
(d) the substrate of the feed for the test was for sea bream feeding (TAI DELUX S-8, sea bream feeding formula feed, Nisshin brand)(the components of the substrate are shown in TABLE 13, the raw materials of the substrate are shown in TABLE 14, and the substrate additives are shown in TABLE 15).
(e) the fishes to be measured were measured in fillets;
(f) the measurement part for the measurement of the above-sated item (8): asthaxanthine content was the body skin of the fillets.

The composition of the substrate of the cultured fish feed used in this test are shown in TABLE 13. The raw materials of the substrate are shown in TABLE 14, and the substrate additives are shown in TABLE 15.

TABLE 13

Composition of the substrate of red sea bream culture feed

| Component Amount | Crude protein | Not less than 46.0% |
| --- | --- | --- |
| | Crude fat | Not less than 13.0% |
| | Crude fiber | Not more than 3.0% |
| | Crude ash | Not more than 17.0% |
| | Calcium | Not less than 2.20% |
| | Phosphorus | Not less than 1.30% |

TABLE 14

Raw materials of substrate of red sea bream culture feed
Raw Materials, etc.

| Classes of Raw Materials | Blend Ratio | Raw Materials |
| --- | --- | --- |
| Animal feed | 60% | Fish powder, (Euphausiid meal) |
| Cereals | 26% | Wheat flour, (Dextrin), (Tapioca starch) |
| Vegetable oil Cake | 5% | Soybean oil cake, (Cone gluten meal) |
| Others | 9% | Animal fat, Calcium Phosphate, (Feed Yeast), KPA-F |

Note:
1. KPA-F was not used in the control section.
2. The bracketed raw materials are not essentially used.

TABLE 15

Contents of the Substrate Additives of Red Sea Beams Culture Feed

Names of Contained Feed Additives

Vitamin A, Vitamin D3, Vitamin E, Vitamin K3, Vitamin B1, Vitamin B2, Vitamin B6, Vitamin B12, Nicotinic acid, Pantothenic acid, Folic acid, Choline, Inositol, Biotin, Vitamin C, Iron sulfate, Manganese sulfate, Magnesium sulfate, Zinc sulfate, Copper sulfate, Cobalt sulfate, Calcium iodate, Ethoxyquin, Asthaxanthine.

The substrate improving additive using in this test is proanthocyanidin as same as the cultured test described before and the amount of the additives to the substrate is 0.1% of KPA-F.

Test Result

Meat composition of sampled fishes is shown in TABLE 16.

TABLE 16

Meat composition of cultured red sea breams
Test item: Component Analysis
Result

| Measured Item | Preserve | |
|---|---|---|
| | Test Section | Control Section |
| Water (%) | 71.2 | 70.4 |
| Fat (%) | 6.89 | 7.38 |
| PH | 6.24 | 6.10 |
| Asthaxanthine (ppm) | 14.3 | 2.75 |

Based on TABLE 16, it is found that the asthaxanthine content of the body skin of the test section is extremely larger (11.55 ppm, 5.2 times) (than that of the control section. To know what this larger content influences the color difference of the body skin of the sample fishes, the color difference data are shown in TABLE 17 and 18. TABLE 17 shows values of the test section. TABLE 18 shows values of the control section.

TABLE 17

Color difference data

| Sample | L (Lightness) | a (Red-green color difference) | b (Yellow-blue color difference) | a/b (Saturation) |
|---|---|---|---|---|
| 1 | 45.10 | 7.48 | 8.99 | 0.83 |
| 2 | 48.52 | 4.69 | 7.99 | 0.59 |
| 3 | 51.59 | 4.94 | 8.79 | 0.56 |
| 4 | 54.78 | 1.88 | 7.91 | 0.24 |
| 5 | 50.68 | 6.16 | 8.96 | 0.69 |
| Average | 48.96 | 6.97 | 9.31 | 0.75 |

TABLE 18

Test item: Color difference
(Body skin of Fishes of Control Section)
Result

| Sample | L (Lightness) | a (Red-green color difference) | b (Yellow-blue color difference) | a/b (Saturation) |
|---|---|---|---|---|
| 1 | 53.63 | 4.41 | 9.69 | 0.46 |
| 2 | 53.33 | 3.85 | 9.60 | 0.40 |
| 3 | 51.22 | 5.58 | 10.97 | 0.51 |
| 4 | 54.88 | 3.21 | 9.04 | 0.36 |
| 5 | 51.73 | 3.88 | 8.47 | 0.46 |
| Average | 53.60 | 5.15 | 10.43 | 0.49 |

Based on these two tables, it is seen that the body skin of the fishes of the test section are brighter than that of the control section (L=48.96:53.60); the red is intenser(a= 6.97:5.15), the yellow is intenser (b=9.31:10.43), and the saturation is higher (a/b=0.75:0.49). That is, the body skin of the control section gives fresh impression to people who look at it.

What is claimed is:

1. A feed for improving body color and meat brilliance of cultured fishes and preventing decrease in astaxanthin in said fishes, said feed comprising:

a substrate material;

an amount of proanthocyanidin by weight of from 0.004 percent to 0.04 percent; and an amount of astaxanthin by weight of from 0.004 percent to 0.02 percent.

* * * * *